Dec. 31, 1968   H. R. YOST   3,419,127
TENSION CARRIAGE FOR PASSENGER CONVEYORS
Filed July 11, 1966   Sheet 1 of 3

INVENTOR
HERMAN RUDOLPH YOST
BY W. L. Hunter ATTORNEY

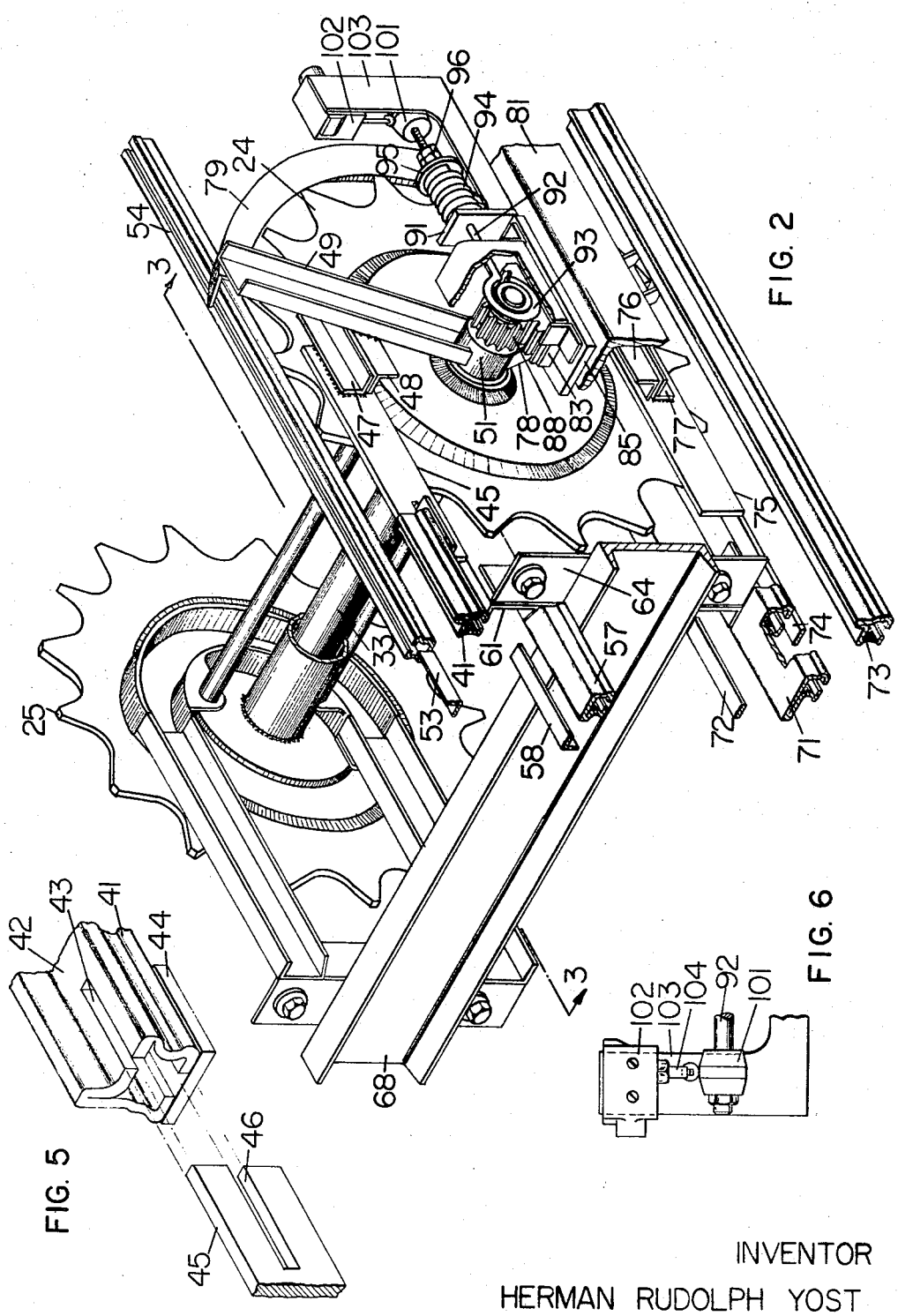

United States Patent Office 3,419,127
Patented Dec. 31, 1968

3,419,127
TENSION CARRIAGE FOR PASSENGER
CONVEYORS
Herman Rudolph Yost, Lincoln Park, N.J., assignor to
Otis Elevator Company, New York, N.Y., a corporation
of New Jersey
Filed July 11, 1966, Ser. No. 564,239
10 Claims. (Cl. 198—16)

ABSTRACT OF THE DISCLOSURE

A tension carriage for passenger conveyors including a pair of driving chains which pass around a pair of idler sprockets each rotatably mounted on a shaft but rigidly fastened together by a sleeve surrounding the shaft, in which a pinion on each end of the shaft is engaged and supported by a fixedly mounted rack and which includes a pair of springs urging the shaft in a direction to tighten the chains.

---

This invention relates generally to passenger conveyors and particularly to a novel tension carriage for the driving chains of such conveyors.

One general class of passenger conveyors comprises an endless series of platforms drawn by a pair of endless roller chains. One end of each platform is supported by a transverse axle on opposite ends of which one roller or wheel of each chain is journaled. The other end of each platform is supported by a pair of individually mounted wheels sometimes called trailer wheels, although this designation is somewhat inappropriate because usually the platforms may move in either direction. The chains with the platforms attached, pass over a pair of motor driven sprockets at one end of the conveyor and over a pair of idler sprockets at the other end. It has been a common practice to mount the roller sprockets on a longitudinally movable assembly called a tension carriage, which carriage also supports portions of the tracks which guide the chains and platforms over the sprockets. Such a tension carriage is required to perform a number of functions. First, it must guide the chains and platforms around the sprockets so as to return the platforms to the opposite landing. Second, it must permit the position of the sprocket axis to be adjusted to accommodate different chain lengths. The total length of the chain depends on the number of platforms and therefore varies in increments of the platform length. Accordingly, the position of the sprocket axis must be adjustable, at least initially, over a range equal to at least one half the platform length. Additionally, the chains stretch due to wear and the carriage assembly must urge the sprocket axis in a direction to keep the chains taut. Third, the lengths of the tracks for the chain wheels must be adjustable to correspond with different chain lengths. Such adjustment has usually been accommodated with telescoping track sections. Fourth, the tension carriage must guide the platforms to keep them perpendicular to their direction of travel so that the cleats of the platforms do not bind against the teeth of the comb plate.

Although tension carriages for performing the above functions have been made in the past, they have not been entirely satisfactory. In general, the prior devices have been heavy, because they included large castings, and have been quite complex because, among other things, they have used side thrust rollers as well as supporting wheels and accordingly have required auxiliary tracks to accommodate these wheels and rollers.

It is a general object of the persent invention to provide an improved tension carriage for a passenger conveyor.

Another object is to provide a tension carriage requiring neither side thrust rollers nor supporting wheels.

Another object is to provide a tension carriage requiring fewer and shorter telescopic track sections.

Another object is to provide a tension carriage which is substantially lighter than prior carriages.

Briefly stated, a preferred embodiment of the invention comprises a transverse shaft on which the two idler sprockets carrying the driving chains are rotatably mounted. A hollow torque tube surrounds the shaft and is rigidly fastened to each sprocket so that they rotate in unison. A pair of pinions are fastened to the shaft, one near each end. These pinions mesh with and are supported by a pair of stationary racks, mounted horizontally on the conveyor frame or truss. A pair of springs acting between the shaft and the truss maintain the chains taut. The tracks for guiding the chain wheels to and from each idler sprocket comprise a first or outer pair of tracks fixedly mounted on the truss in a position radially beyond the circumference of the sprocket and a second or inner pair each including a first portion supported by the shaft and slidably engaging a second portion fixedly mounted on the truss. It has been found to be unnecessary to provide telescopic or other sliding engagement for any of the tracks guiding the trailer wheels and accordingly these tracks are initially adjusted in length to accommodate the particular length of chain required and are then fixedly mounted on the truss.

For clearer understanding of the invention reference may be made to the following detailed description and the accompanying drawing, in which:

FIGURE 2 is a three dimensional view with some parts omitted, of a tension carriage in accordance with the invention;

FIGURE 5 is a fragmentary exploded view of a telescopic joint of one of the tracks; and FIGURE 6 is a fragmentary elevation view of a detail.

Figure 1:
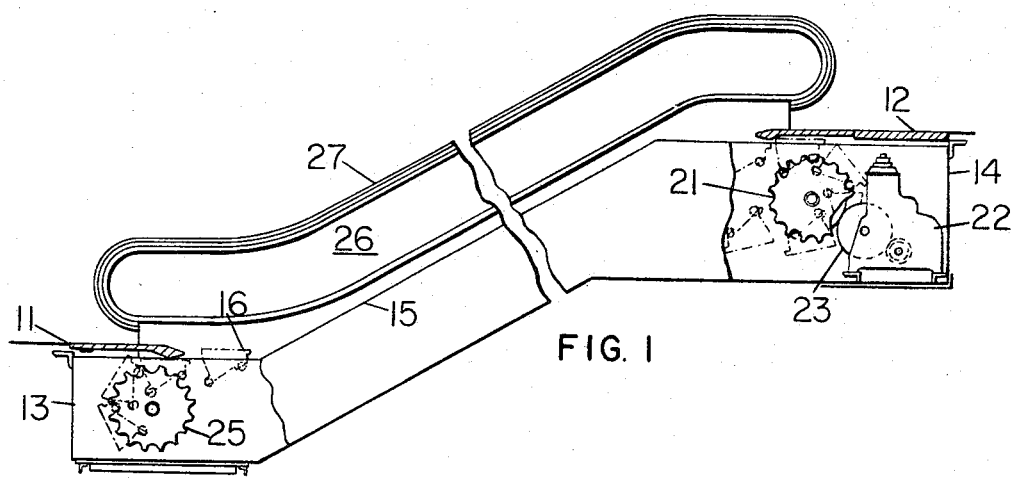
FIGURE 1 is an elevation view, with some parts broken away, of a moving stairway incorporating the present invention.

Referring first to FIGURE 1 there is shown a passenger conveyor, for example a moving stairway, for carrying passengers between a first landing area 11 and a second landing area 12. The truss or frame on which the conveyor is supported includes a first portion 13, located generally beneath the first landing area 11, a second portion 14 generally beneath the second landing area 12, and an intervening portion 15 which, in the case of the moving stairway illustrated, is an inclined portion. The passengers are carried by an endless series of platforms 16 each connected to a pair of endless chains (not shown clearly in FIGURE 1) which draw the platforms in a closed path which path includes an active or upper run at approximately the level of the top of the truss and a return or lower run near the bottom of the truss. Beneath the landing 12 the chains pass around a pair of driving sprockets one of which, the sprocket 21, is shown in FIGURE 1. A power unit 22, preferably comprising an electric motor and speed reducing gearing, suitably is connected to the sprockets, for example, through a gear train 23. In addition to transmitting power to the chains, the sprockets assist in guiding the chains and platforms between the upper to the lower runs. Beneath the landing 11 are a pair of idler sprockets 24 and 25, one of which, the sprocket 25, is shown in FIGURE 1, and around which the chains and platforms pass as they travel between the upper and lower runs. Above and beside the upper run are the usual pair of balustrades one of which, the balustrade 26, is shown surmounted by a moving handrail 27.

Figure 3:
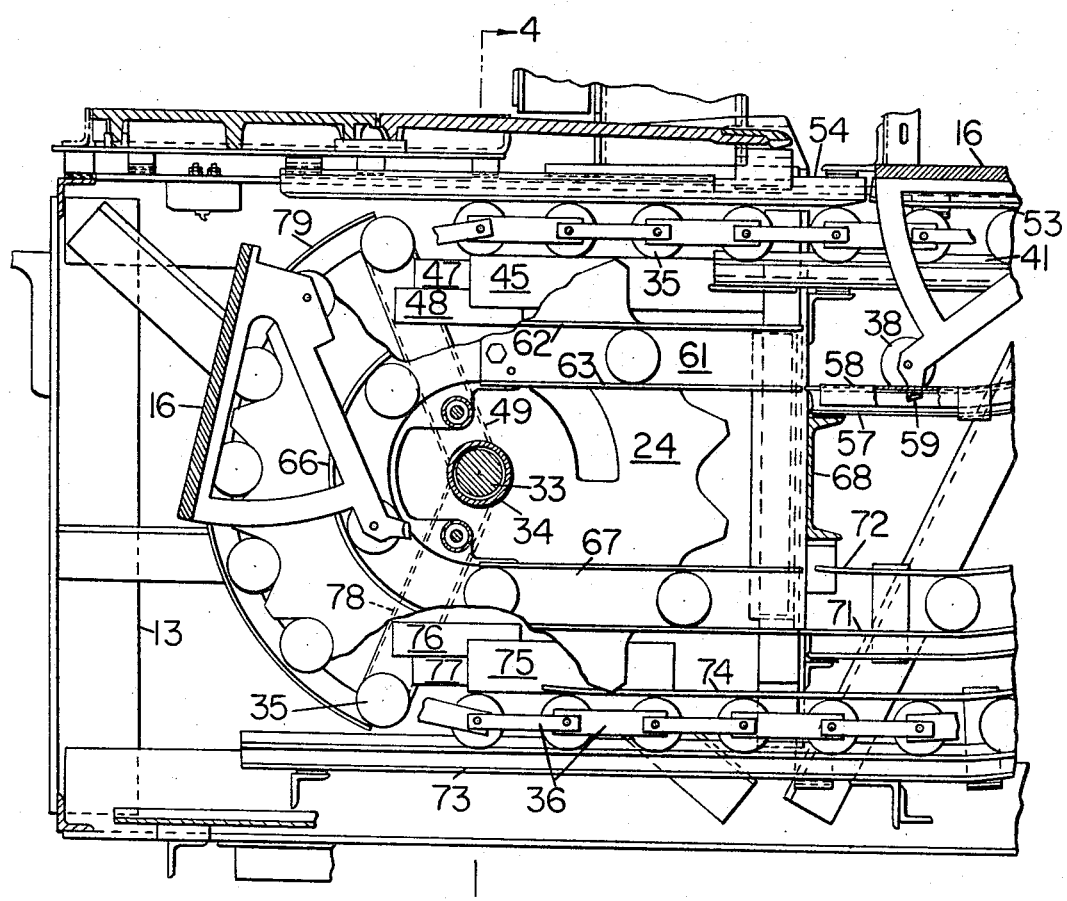
FIGURE 3 is a cross section view taken approximately as indicated by the line 3—3 of FIGURE 2.
Figure 4:
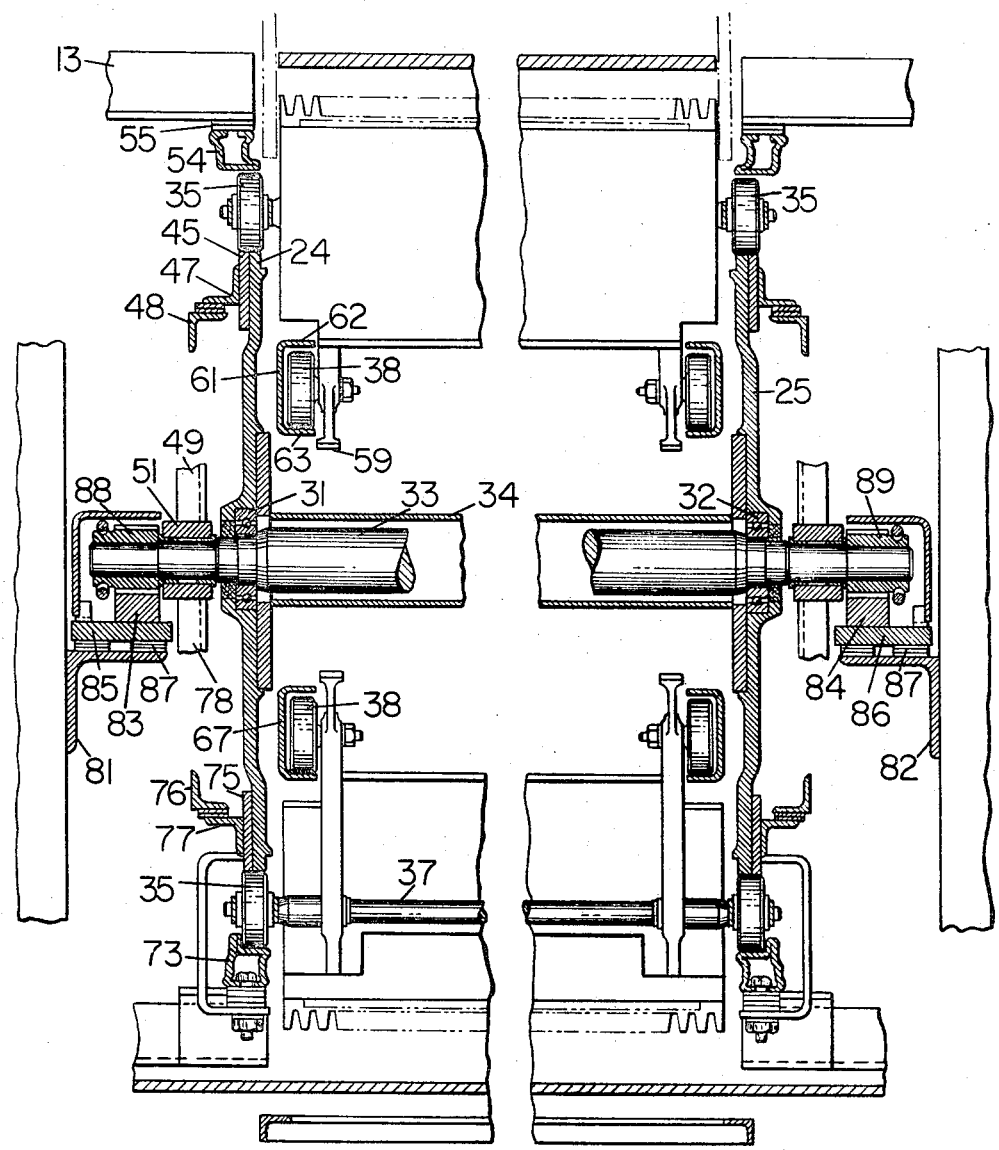
FIGURE 4 is a cross section view taken as indicated by the line 4—4 of FIGURE 3.

Referring now to FIGURES 2, 3, and 4, the previously mentioned idler sprockets 24 and 25 are mounted on bearings 31 and 32 to be freely rotatable about a shaft 33. A hollow torque tube 34 surrounds the shaft 33 and is rigidly fastened at opposite ends to the sprockets 24 and 25 so as to constrain them to rotate in unison. As previously mentioned, a pair of chains are provided, one on each side of the conveyor, each of which comprise a series of wheels 35 joined by links 36. These chains pass over and are engaged by the sprockets 24 and 25. Some chain wheels, for example every third wheel, are provided with an axle 37 which extends across the conveyor to the corresponding wheel on the opposite chain. Each axle carries one end of a platform 16; the other end of each platform is supported by a pair of trailer wheels 38. Most of the platforms have been omitted from the drawing to enable other parts to be shown more clearly.

The tension carriage is required, among other things, to transfer the platforms 16 between the upper and lower runs. This it does by guiding the chain wheels 35 around the idler sprockets 24 and 25 and guiding the trailer wheels 38 around a suitable track. Assume, for illustration, that the platforms are descending, that is, moving along the upper run from right to left as viewed in FIGURE 3. As the platforms descend and before they reach the tension carriage, the chain wheels 35 are supported by an upper chain wheel supporting track 41. This track is rigidly fastened to the truss 15 along the run between landings and extends into the region of the tension carriage. As best shown in FIGURE 5, the smooth upper surface upon which the wheels roll is formed with a slot 43 at the end. A plate 44 is fastened across the bottom of the track 41 near the end. The slot 43 and the plate 44 cooperate with a bar 45, formed with a slot 46 at one end, to form a slidable, telescopic joint. The bar 45 is fastened to a structural angle 47, fastened to another angle 48 which in turn is fastened to a channel shaped brace 49. The latter is fastened to a collar 51 which surrounds and forms a bearing surface against the shaft 33. Thus, the bar 45 moves longitudinally with the shaft 33 and the sprockets 24 and 25 as they move back and forth, as will be more fully explained. The bar 45 is cut to the proper length to fit the particular installation. Such cutting provides for the initial adjustment made necessary by the fact that the total chain length can vary only in increments of the center to center distance between adjacent platforms, making it necessary to allow the sprockets to be initially positioned anywhere over a range of one half this distance. The bar 45 is positioned vertically so that its top edge is flush with the root circle of the sprocket 24. The bar 45 terminates at a point above and slightly beyond the shaft 33. By this arrangement the chain wheels 35 can roll from the track 41 to the bar 45 and then into the space between adjacent sprocket teeth.

The chain wheels are prevented from rising by an upper run chain wheel upthrust track 53 which is a structural angle shape. The track 53 is also rigidly fastened to the truss 15 in the region between landings and terminates just short of the tension carriage. An upthrust track 54 is fastende to a bracket 55 (FIGURE 4) which in turn is fastened to the frame 13. The track 54 extends slightly beyond the tension carriage and is aligned with and almost touches the track 53. In the other direction the track 54 extends above and beyond the sprocket 24 at the proper height to accept the upthrust forces of the wheels.

The descending trailer wheels 38 are supported by a stationarily mounted upper run trailer wheel supporting track 57 beside which is an elongated angle 58. The latter cooperates with a horizontally extending lug 59 on each platform 16 adjacent to each trailer wheel 38 to prevent upward movement of the platform. The track 57 and the angle 58 terminate adjacent to the tension carriage and their function is assumed by a channel shaped member 61. The distance between the flanges 62 and 63 of the member 61 is selected to provide both support and upthrust for the trailer wheels. The channel member 61 is stationarily mounted to a frame member 64, which in turn is fastened to the truss 13, and extends from a position approximately abutting the track 57 and angle 58 to a position approximately above the shaft 33 where it is joined to a U-shaped channel member 66 of the same cross section. The latter extends around and below the shaft 33 as shown, and at the bottom is fastened to another straight channel shaped membre 67, similar to the channel member 61, and also fastened to the frame member 64. Each of the channel members 61 and 67 is cut to a suitable length, not critical, to fit the particular installation. It is to be noted that all these channel shapes, members 61, 66 and 67 are fixedly mounted and do not move with the sprockets 24 and 25 and the shaft 33.

The member 67 terminates adjacent to a cross piece 68, which is part of the truss 13. The lower web thereof abuts the top smooth surface of a lower run trailer wheel supporting track 71 which extends toward the second landing 12. The upper web of member 67 abuts a flat bar 72 which serves as a lower run trailer wheel upthrust track and which also extends toward the landing 12.

A lower run chain wheel supporting track 73 is stationarily mounted on the truss portions 13 and 15. It extends continuously from the intervening portion of the lower run to a point beneath and beyond the sprocket 24 at a level suitable to transfer the chain wheels smoothly from the sprocket 24 to the track 73 or vice versa.

The lower run chain wheel upthrust track comprises two portions. The first is a flat bar 74 fixedly mounted to the truss portions 13 and 15 and extending from the intervening portion of the lower run to the vicinity of the sprocket 24. The bar 74 is disposed with its broad sides approximately horizontal and with the bottom surface approximately level with the root circle of the sprocket 24. The second portion is a flat bar 75 disposed beside and touching the bar 74 and with the broad sides approximately vertical and with the bottom narrow edge flush with the bottom surface of the bar 74. The bar 75 is fastened by angle brackets 76 and 77 to a channel shaped brace 78 which in turn is fastened to the previously mentioned collar 51. Laterally, the bar 75 is positioned beside but not touching the sprocket 24. The bar 75 moves back and forth with the sprockets 24 and 25 and the shaft 33 and form a sliding joint with the bar 74 which is suitably cut to length to fit the particular installation. The channel braces 49 and 78, as previously mentioned, are both fastened to the collar 51 which surrounds the shaft 33. As best shown in FIGURE 3, these braces extend radially and backward from the shaft 33, each making a small angle with the vertical. At their outer ends the braces 49 and 78 are fastened to an arcuate guard member 79 which has an angle shaped cross section. The member 79 is located radially just beyond the sprocket 24 at the proper distance to engage any chain wheel 35 which might start to leave engagement with the root of the sprocket 24 as it travels from the upper to the lower run or vice-versa.

The truss 13 includes angle shaped members 81 and 82 which extend longitudinally, one adjacent to each side of the conveyor, in the region of the landing 11 at a level below that of the shaft 33. The members 81 and 82 have horizontal surfaces which support racks 83 and 84 respectively. These racks are fastened to or formed integrally with plates 85 and 86 respectively which in turn are fastened, for example by bolts (not shown), to the members 81 and 82 respectively. If necessary, shims 87 may be used between the members 81 and 82 and the plates 85 and 86 to adjust the height of the racks. The racks 83 and 84 are formed with upstanding teeth each of which extends substantially parallel to the shaft 33 so as to mesh with and support pinions 88 and 89 which pinions are rigidly fastened to the shaft 33 near opposite ends thereof.

A plate 91 is rigidly fastened in a substantially vertical position to the plate 85 a short distance behind the rack 83. The plate 91 is formed with an aperture through which passes the shank 92 of an eye bolt 93 the eye of which surrounds the protruding end of the pinion 88 and engages an annular groove formed therein. A compression spring 94 surrounds the shank 92 and acts between the plate 91 and a spring seat 95 held on the shank by a nut 96. It is apparent that the spring 94 urges the end of the shaft 33 in a direction parallel to the direction of travel of the conveyor and away from the second landing 12. A similar spring (not shown) is installed in like manner at the opposite side of the conveyor to urge the other end of the shaft 33 in the same direction.

It will be recalled that the tension carriage must make provision for initially positioning the shaft 33 anywhere within a range equal to at least one half the center to center distance between adjacent platforms. This is readily accomplished with the present invention. When the required initial position of the shaft 33 is determined, the racks 83 and 84 and the plates 85 and 86 fastened thereto are positioned on the members 81 and 82 so that the racks engage and support the pinions 88 and 89 yet leave enough room to allow movement of the shaft 33 to compensate for chain stretch. The racks are then secured in this position, preferably by drilling suitable holes in the plates 85 and 86 and the members 81 and 82, and passing bolts therethrough.

It will also be recalled that the sprockets 24 and 25 are journaled for rotation about the shaft 33 so that they may rotate without rotating the shaft 33 or the pinions 88 and 89 attached thereto. The tube 34 constrains the sprockets to rotate together. The shaft 33 (and the sprockets 24 and 25 with it) can move parallel to the direction of travel of the conveyor, and is so urged by the spring 94 and the corresponding spring on the other side to compensate for lengthening of the chains due to wear and to keep the chains taut at all times. The two racks and pinions constrain the two ends of the shaft to move in unison. Therefore, the shaft remains at all times perpendicular to the direction of travel of the conveyor, even if the chains on opposite sides should lengthen unevenly due to uneven wear. Accordingly, the platforms also remain perpendicular to their direction of travel, and their cleats mesh smoothly without binding with the teeth of the stationary comb plate.

As best shown in FIGURE 6, a cam 101 is fastened near the end of the shank 92 of the eye bolt 93. A switch 102 is mounted on a bracket 103 which in turn is fastened to the plate 85. The switch 102 includes an actuator 104 the end of which carries a roller and which is resiliently urged into engagement with the surface of the cam 101. As shown, the cam 101 is shaped so that longitudinal movement of the cam in excess of a predetermined amount in either direction from the position shown will actuate the switch 102. Such movement is caused by excessive movement of the shaft 33 which in turn might occur if, for example, a foreign object became lodged in the mechanism so as to impede or stop the movement of the platforms. The switch 102 may be connected in any well known manner so shut off the power and/or initiate other safety or warning operations.

It is to be understood that passenger conveyors are quite complicated mechanisms and that only those parts are shown in detail which are necesary to an understanding of the present invention. For example, in FIGURE 2 the tracks on but one side of the conveyor have been shown, it being understood that similar tracks are provided on the opposite side. Other necessary parts which have not been shown in detail herein may conform to well known practice. More specifically, they may, when consistent, be similar to those shown and described in United States Patent No. 2,686,585 to Margles et al.

It is to be noted that in a tension carriage according to the present invention, the longitudinally moving parts are limited the shaft 33, the sprockets 24 and 25, the torque tube 34, the pinions 88 and 89, the track portions 45 and 75, their supporting brackets 47, 48, 76, 77, the braces 49 and 78 and the guard member 79. This is in contrast to the usual prior tension carriage in which the entire heavy frame supporting the sprockets, etc., was in turn supported by wheels rolling on special tracks. Additionally, in the present invention the platforms are held perpendicular to their direction of travel by the torque tube, rack and pinion arrangement, thereby eliminating the need for the side thrust rollers and their special tracks often used in prior tension carriages.

Although a preferred embodiment of the invention has been described in considerable detail for illustrative purposes, many modifications can be made within the spirit of the invention. It is therefore desired that the protection afforded by Letters Patent be limited only by the true scope of the appended claims.

What is claimed is:

1. A tension carriage for a passenger conveyor which includes a pair of driving chains, comprising,
    a pair of idler sprockets around which said chains pass,
    a shaft about which both of said idler sprockets are journaled for rotation,
    means for interconnecting said sprockets so as to constrain them to rotate in unison,
    first and second pinions rigidly fastened to said shaft near oppsite ends thereof,
    first and second racks stationarily mounted and positioned to engage and support said first and second pinions respectively, and
    resilient means urging said shaft in a direction to tighten said chains.

2. Apparatus according to claim 1 in which said means for interconnecting comprises a tube surrounding but spaced from said shaft and extending between and rigidly fastened to each of said sprockets.

3. A tension carriage for a conveyor, which conveyor includes an endless series of platforms pulled between first and second landings and back again by a pair of power driven endless chains attached thereto which chains each pass around an idler sprocket beneath said first landing, comprising,
    a shaft upon which both of said idler sprockets are rotatably mounted,
    said shaft being located beneath said first landing and disposed perpendicular to the direction of travel of said conveyor,
    means mechanically interconnecting said sprockets so that they rotate in unison,
    first and second pinions rigidly fastened to said shaft near opposite ends thereof,
    a stationary truss,
    first and second racks mounted on said truss and positioned to engage and support said first and second pinions respectively,
    whereby said shaft and said platforms are constrained to remain perpendicular to the direction of travel of said conveyor, and
    means for resiliently urging said shaft parallel to the direction of travel of said conveyor and away from said second landing.

4. Apparatus according to claim 3 in which said means for urging comprising first and second springs each acting between said shaft and said truss.

5. Apparatus according to claim 3 in which said means interconnecting comprises a tube surrounding said shaft and extending between and rigidly fastened to said idler sprockets.

6. Apparatus according to claim 5 in which said means for urging comprises first and second springs acting between said truss and said shaft at points adjacent to said first and second pinions respectively.

7. A passenger conveyor, comprising,
a truss,
a pair of chains each including a plurality of chain wheels joined together by links,
a plurality of platforms each supported at one end by a transverse axle on opposite ends of which are journaled one wheel of each of said chains and each supported on the other end by a pair of trailer wheels,
means for guiding said chains and platforms along a closed path between first and second landings and back again,
said path including an upper run for supporting and transporting passengers and a lower run for returning said platforms to the other landing,
means beneath said first landing including a pair of driving sprockets over which said chains pass for imparting movement to said chains and for transferring said chains and platforms from one to the other of said runs, and
means including a pair of resiliently mounted idler sprockets rotatable oly in unison and positioned beneath said second landing near opposite sides of said conveyor for maintaining said chains taut and for transferring said chains and platforms from one to the other of said runs,
said means for guiding comprising a first track system for guiding said chain wheels to and from engagement with said idler sprockets for transition between said upper and lower runs and including, on each side, both supporting and upthrust tracks for both upper and lower runs,
said upper run upthrust and lower run supporting tracks on each side each being stationarily mounted on said frame and positioned respectively above and below its associated idler sprockets,
said upper run supporting and lower run upthrust tracks on each side each comprising first and second portions joined together with a telescopic joint, each of said first portions being stationarily mounted on said truss and each of said second portions being mounted on brackets journaled on said shaft,
said means for guiding further including a second track system for guiding said trailer wheels during transition between said upper and lower runs,
said second track system including, on each side, both supporting and upthrust tracks for both said upper and lower runs, all stationarily mounted on said truss.

8. Apparatus according to claim 7 in which said supporting and upthrust tracks included in said second track system comprise, on each side, a track member of generally channel shaped cross section stationarily mounted on said truss with the web thereof substantially vertical and of a size to accommodate said trailer wheels between the flanges thereof and formed in the shape of a U lying on its side,
whereby the upper leg of said U forms the supporting and upthrust tracks for the transition portion of said upper run while the lower leg of said U forms the supporting and upthrust tracks for the transition portion of said lower run.

9. Apparatus acording to claim 7 in which said means for maintaining said chains taut and for transferring them comprises,
a shaft on which each of said idler sprockets is rotatably mounted,
mechanical means interconnecting said sprockets for constraining them to rotate only in unison,
first and second pinions rigidly fastened to said shaft near opposite ends thereof,
first and second racks mounted on said truss and positioned to engage and support said first and second pinions respectively, and
spring means acting between said shaft and said truss for urging said shaft in a direction to tighten said chains.

10. A passenger conveyor, comprising, a pair of driving chains, a plurality of platforms each having a first end attached to each of said chains so as to form an endless series of platforms drawn in a closed path from a first landing to a second landing and back, a pair of supporting wheels for each of said platforms attached to a second end thereof, a pair of idler sprockets positioned beneath said first landing around which said chains and platforms pass, a shaft on which each of said sprockets is rotatably mounted, mechanical means interconnecting said sprockets for constraining them to rotate only in unison, first and second pinions rigidly fastened to said shaft near opposite ends thereof, first and second racks stationarily mounted and positioned to engage and support said first and second pinions respectively, means for resiliently urging said shaft in a direction to tighten said chains, and track members beneath said first landing for guiding each of said pairs of wheels in an approximately semicircular path as said chains and platforms pass around said sprockets, said track members being fixedly mounted so as to remain stationary despite movement of said sprockets.

References Cited

UNITED STATES PATENTS

| | | | |
|---|---|---|---|
| 1,796,127 | 3/1931 | Stephenson | 198—208 |
| 1,956,153 | 4/1934 | Lindquist et al. | 198—16 |
| 2,059,007 | 10/1936 | Marmorstein et al. | 198—16 |
| 2,088,460 | 7/1937 | Bouton | 198—16 |

RICHARD E. AEGERTER, *Primary Examiner.*

U.S. Cl. X.R.

198—208